Figure 1:
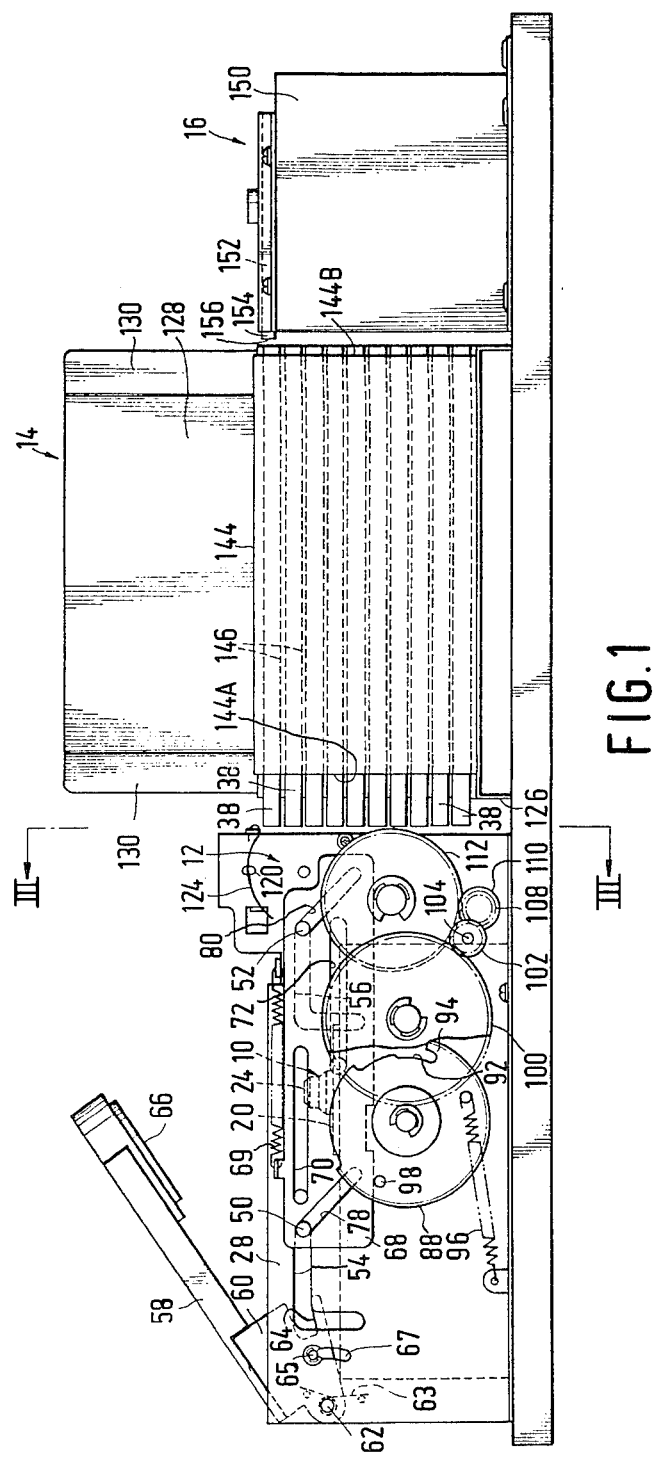

United States Patent [19]

Nakayama

[11] Patent Number: 4,479,210
[45] Date of Patent: Oct. 23, 1984

[54] RECORD-DISC PLAYER

[75] Inventor: Mituhisa Nakayama, Kanagawa, Japan

[73] Assignee: U.S. Philips Corporation, New York, N.Y.

[21] Appl. No.: 551,223

[22] Filed: Nov. 14, 1983

[30] Foreign Application Priority Data

Nov. 19, 1982 [JP] Japan .................................. 57-202161
Dec. 24, 1982 [JP] Japan .................................. 57-195237

[51] Int. Cl.³ ........................ G11B 17/04; G11B 17/26
[52] U.S. Cl. ................................... 369/194; 369/75.2;
369/270; 369/261; 360/98
[58] Field of Search ............. 369/194, 270, 261, 75.2; 360/98

[56] References Cited

U.S. PATENT DOCUMENTS 3,899,181  8/1975  Dannert et al. ..................... 369/194

FOREIGN PATENT DOCUMENTS 59115    12/1979  Japan ................................... 369/261
125575    9/1980  Japan ................................... 369/270
2112994   7/1983  United Kingdom .

Primary Examiner—Charles Frankfort
Assistant Examiner—Thomas P. Matecki
Attorney, Agent, or Firm—Robert S. Smith

[57] ABSTRACT

For loading a record disc on the turntable of a record-disc player, a loading device is provided which comprises a movable loading support for supporting a holder containing a record disc. The loading support is slidably supported between two fixed, parallel, vertical guide plates by pins on the support sliding in L-shaped guide slots in the guide plates, each slot having a vertical section extending downwardly from a horizontal section. Slidably supported on the outer sides of the guide plates for horizontal movement in vertical planes parallel to the planes of the guide plates are two drive plates having inclined slots in which the pins on the loading support slidably engage. By cooperation between the inclined slots and the pins the drive plates can move the loading support, guided by the L-shaped slots in the guide plates, along a horizontal path and down a vertical path to deposit the record disc supported on the loading support on the turntable. Pivotally supported between the guide plates is an arm carrying a pressure member for urging the loaded disc into a centered position on the turntable.

4 Claims, 13 Drawing Figures

RECORD-DISC PLAYER

The invention relates to a record-disc player with a loading device for loading a record disc on the turntable of the player, the loading device comprising a movable loading support for supporting the disc, a guide plate fixed in a vertical plane and formed with L-shaped guide slots each comprising a horizontal section and a vertical section extending downwardly from the horizontal section at an end thereof, a drive plate supported for movement in a horizontal direction and a plane parallel to the plane of the guide plate and formed with slots which are inclined to the direction of movement of the drive plate, the loading support comprising pins, each of which engages in an associated one of said guide slots and an associated one of said inclined slots, and a toothed rack on the drive plate and a pinion for cooperation with the rack to move the drive plate, said guide slots being arranged to guide the loading support, by cooperation with said pins, from a rest position along a horizontal path and down a vertical path to deposit the record disc supported on the loading support on the turntable, and said inclined slots being cooperable with said pins, during movement of the drive plate, to move the loading support along and down said paths respectively.

A record-disc player with a loading device of this construction is described in British Patent Specification No. 2,112,994A.

In a record-disc player in which the turntable rotates at high speed, for example, a player for playing optical audio discs such as those known as "Compact Discs", it is necessary to employ a pressure member for urging the record disc into a centred position on the turntable while the turntable is rotating. The known record-disc player does not have such a pressure member.

It is an object of the invention to provide a record-disc player having a loading device of the above construction with a pressure member which is moved between an inoperative and an operative position by the loading device.

The record-disc player according to the invention is characterized in that it comprises a pivoted arm carrying a pressure member for urging the loaded disc into a centred position on the turntable, the arm being pivotable between an inoperative position and an operative position about a horizontal axis perpendicular to the directions of movement of the loading support, and the arm comprising a part formed with a recess which, when the arm is in the inoperative position, is located beside and coincides with the horizontal section of one of the guide slots in the guide plate at the end of said section which adjoins the vertical section of the slot, with the mouth of the recess facing towards the other end of the horizontal section, so that when the pin on the loading support which engages in that guide slot reaches the end of the horizontal section of the slot which adjoins the vertical section during the loading movement of the loading support, the pin enters said recess, and as the pin moves down the vertical section of the slot it cooperates with the recess to move the arm to the operative position.

With this arrangement there is no need to provide a separate means for moving the pressure member to the operative position, since this is done by the loading support as it moves downwards to load the record disc on the turntable. The return movement of the pressure member can also be carried out by the loading support during its unloading movement.

A preferred embodiment of the invention is characterized in that said part of the arm comprises a plate which is pivotally supported on the guide plate for movement about said axis in a plane parallel to the plane of the guide plate, and in an edge which the recess is formed. This provides a compact construction since it does not lead to an increase in the width of the record-disc player.

The arm may be urged by spring means to its inoperative position, which position may be determined by stop means on the guide plate.

Figure 2:
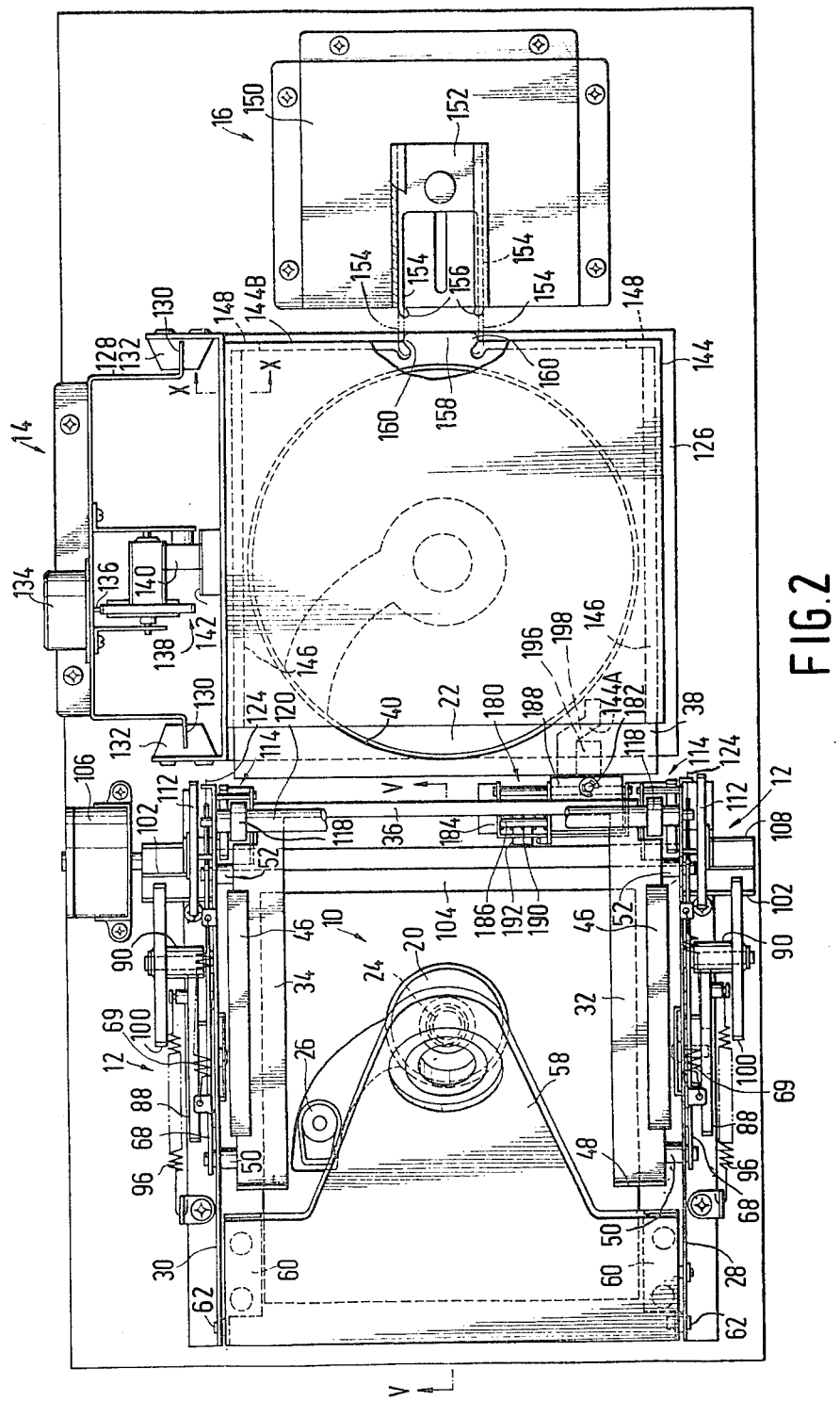
Figure 3:
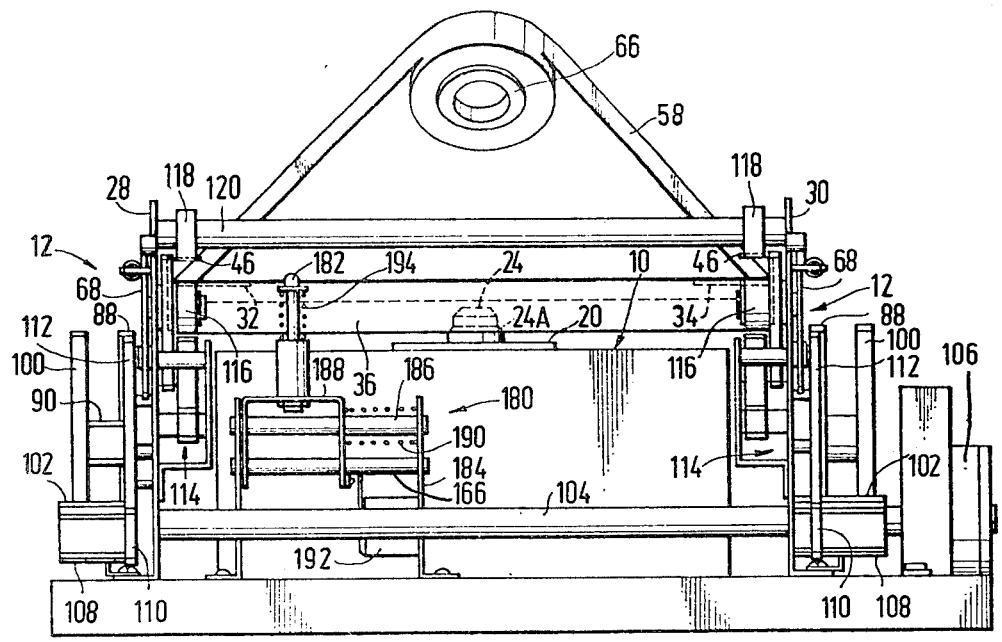
Figure 4:
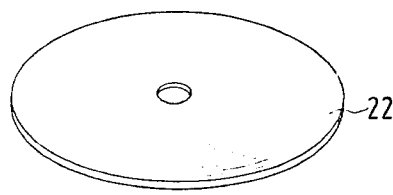
Figure 4:
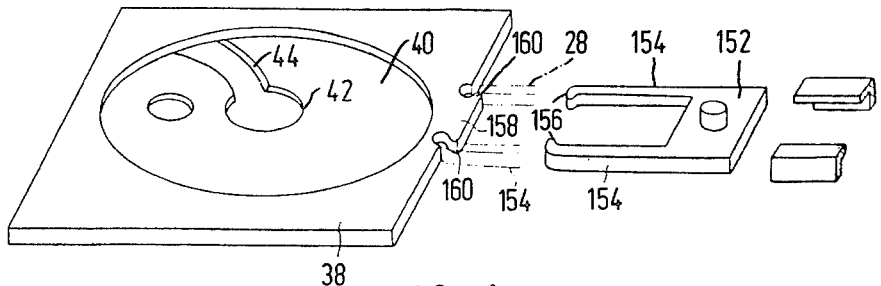
Figure 5:
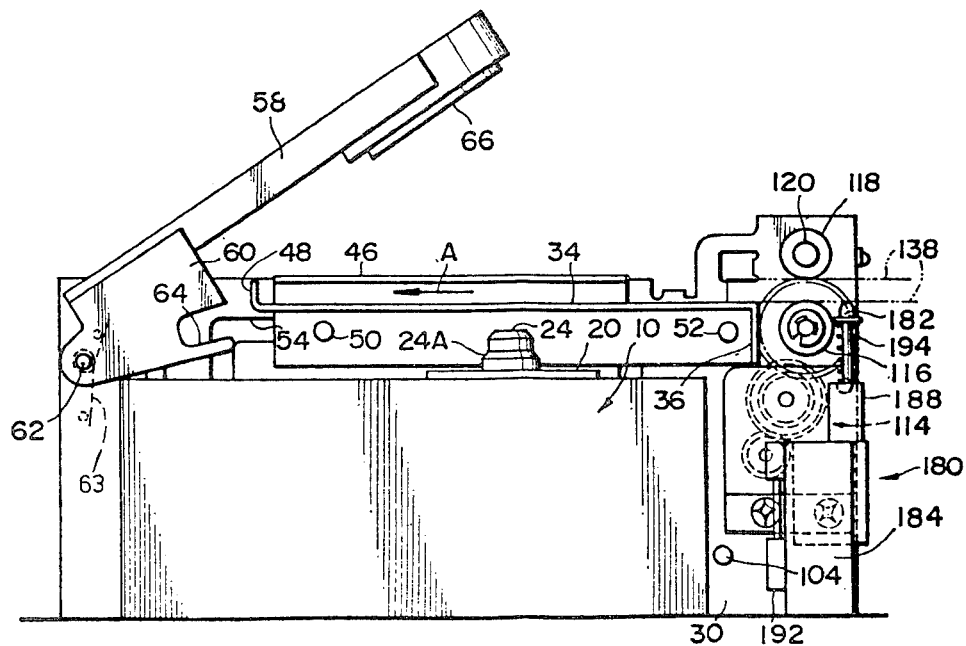
Figure 6:
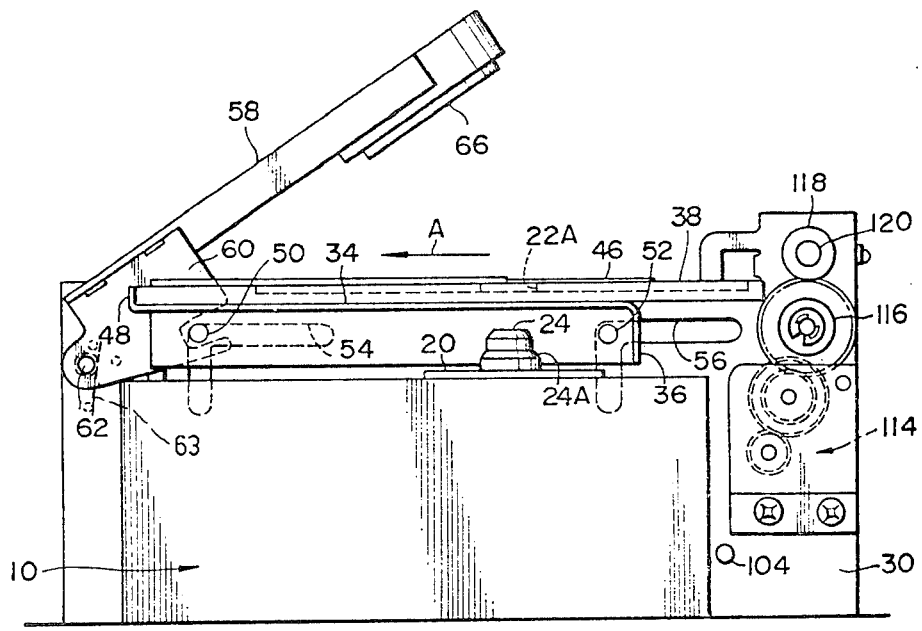
Figure 7:
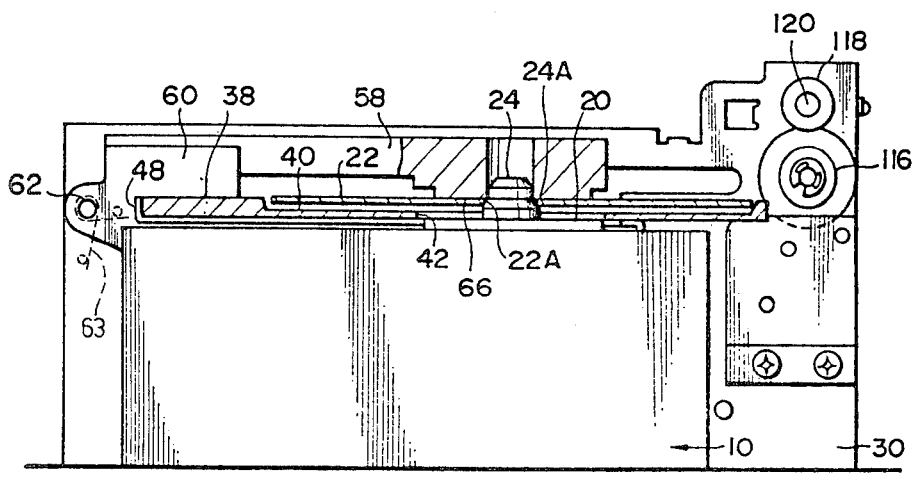
Figure 8:
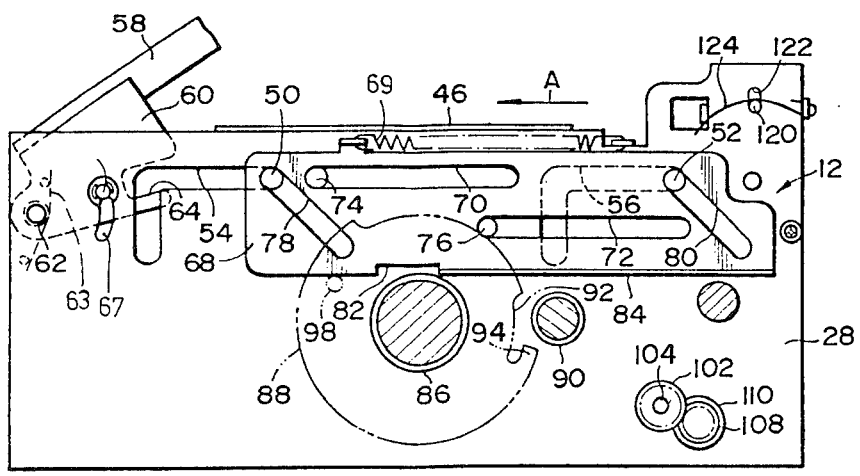
Figures 9, 10, 11, 12, 13:
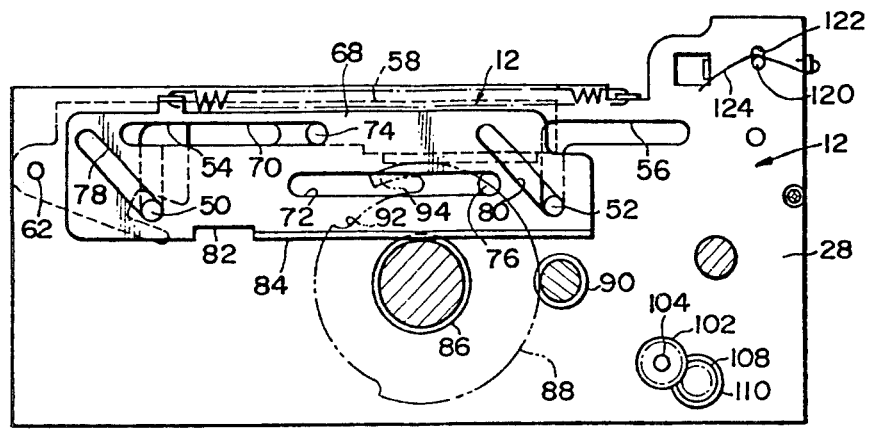

An embodiment of the invention will now be described with reference to the accompanying drawings, in which FIG. 1 is an elevation of an automatic record-disc changer, FIG. 2 is a plan view of this disc changer, FIG. 3 is a sectional view taken on the line III—III in FIG. 1, FIG. 4 is a perspective view of a record disc and one of the disc holders of the disc changer, FIG. 5 is a sectional view taken on the line V—V in FIG. 2, FIGS. 6 and 7 are views similar to FIG. 5 showing the loading device an intermediate stage and at the end, respectively, of the loading operation, FIGS. 8 and 9 are side views, partly in section, showing the loading device in the rest position and at the end of the loading operation, respectively, FIG. 10 is a sectional view of part of the magazine for containing the disc holders, the section being taken on the line X—X in FIG. 2, FIG. 11 is a view of the underside of one of the disc holders, and FIGS. 12 and 13 are fragementary sectional views taken on the lines XII—XII and XIII—XIII, respectively, in FIG. 11.

The disc changer shown in the drawings includes a player 10 for playing optical audio discs, for example, those known as "Compact Discs". Next to the player is a magazine 144 which contains a plurality of disc holders 38 in the form of square plates each having a shallow circular recess 40 (see FIG. 4) in its upper side to receive a record disc 22. The disc holders 38 are supported in horizontal positions one above another in the magazine and can be slid freely into and out of the magazine. The magazine is carried by a device 14 which can raise and lower the magazine to bring a selected disc in its holder to a predetermined level (hereinafter referred to as the "transfer level") at which this holder and disc can be transferred from the magazine to a loading device 12 for loading the selected disc on the turntable 20 of the player 10. A small initial displacement of the holder from the magazine is effected by a device 16 located next to the magazine at the opposite side thereof from the player 10. The player and the devices 12, 14 and 16 are all mounted on a common base 2.

The player 10 has a magnetic turntable with a central, upwardly protruding centering pin 24. As can be seen in FIG. 7, the centring pin 24 has a frusto-conical centering surface 24A which engages in the centre hole 22A of the record disc which is loaded on the turntable. This locates the disc accurately on the turntable so that the disc rotates exactly concentrically with the turntable. Electric motors (not shown) are provided within the housing of the player 10 for driving the turntable and for tracking a read head 26 across the disc on the turntable. In known manner, the read head optically reads the pits and/or protrusions of the disc by means of a laser beam.

The loading device 12 comprises two parallel vertical guide plates 28 and 30 which are fixed on the base 2 outside the player 10 at two opposite sides of the player and which extend in directions parallel to that in which the disc holders 38 are transferred from the magazine 144 to the loading device. Between the guide plates 28 and 30 is a movable loading support consisting of a horizontal U-shaped frame formed by two elongate side members 32 and 34 which extend parallel to the guide plates 28 and 30 and which are interconnected by a transverse member 36 (see FIG. 2). The side members 32 and 34 have flat parts 32A and 34A respectively which lie in a common horizontal plane for supporting a disc holder 38, as shown in FIGS. 6 and 7. The side members also have side walls at the outer edges of the parts 32A and 34A, which side walls, over at least part of the length of the side members, project above the parts 32A and 34A and turn inwardly at the top to form guides 46 of inverted L-shaped cross-section for guiding a disc holder as it is being slid onto the parts 32A and 34A during the transference of the holder from the magazine 144 to the loading device 12. The final position of the disk holder on the loading support is determined by stops 48 which are formed by upturned positions at the ends of the parts 32A and 34A which are remote from the magazine.

Two pins 50 and 52 project outwardly from the side wall of each of the side members 32 and 34 of the loading support to engage slidably in L-shaped guide slots 54 and 56 respectively in the adjacent fixed guide plate 28 or 30. The slots 54 and 56 each comprise a horizontal section to define a horizontal path of movement for the loading support and a vertical section which extends downwardly from the horizontal section at the end thereof remote from the magazine 144 to define a vertical path of movement for the loading support. The vertical sections of the slots are so disposed that when the pins 50 and 52 are in these sections, and a disc holder 38 carrying a disc 22 is supported on the loading support, the centre hole 22A of the disc is in alignment with the centering pin 24 of the turntable 20, as shown in FIG. 6.

At the side of the loading device 12 remote from the magazine 144 an arm 58 carrying a magnetic pressure ring 66 is pivotally supported between the fixed guide plates 28 and 30 of the loading device. The arm 58 has two cheek plates 60 which lie in planes parallel to the planes of the guide plates 28 and 30 and which are connected to the plates 28 and 30 respectively by horizontally disposed coaxial pivot pins 62 so that the arm can pivot about a horizontal axis between a raised inoperative position (FIGS. 1, 3, 5, 6 and 8) and a lowered operative position (FIG. 7) in which the pressure ring 66 on the arm, under the influence of magnetic attraction between the pressure ring and the turntable 20, presses a record disc 22 against the centering surface 24A of the centering pint 24 of the turntable, as shown in FIG. 7. The arm 58 is urged into the inoperative position by torsion springs 63 which are wrapped one around each of the pivot pins 62 and which act between abutments on the cheek plates 60 and abutments on the fixed guide plates 28 and 30. Pins 65 projecting from the cheek plates 60 engage slidably in arcuate slots 67 in the guide plates 28 and 30. The abutment of the pins 65 against the upper end of the slots 67 determines the inoperative position of the arm 58. In each of the cheek plates 60 is a recess 64 which has its mouth orientated towards the loading support 32, 34, 36. As shown in FIGS. 1 and 8, the arrangement of the recesses 64 is such that when the arm 58 is in the inoperative position, each of the recesses is located beside and coincides with the horizontal section of the guide slot 54 in the adjacent guide plate 28 or 30 at the end of said section which adjoins the vertical section of the slot, with the mouth of the recess facing towards the other end of the horizontal section. Thus, when the pins 50 on the loading support move to the ends of the horizontal sections of the guide slots 54 which adjoin the vertical sections, as shown in FIG. 6, they enter the recesses 64, and when the pins 50 then move down the vertical sections of the guide slots 54 they bear on the lower walls of the recesses 64 and move the cheek plates 60 down, as shown in FIG. 9, to rotate the arm 58 to the operative position. Although a recess 64 is preferably provided in each of the cheek plates 60, it is possible to have a recess in only one of the plates for engagement by one of the pins 50.

The pins 50 and 52 on the two side members of the loading support project beyond the guide plates 28 and 30 to engage slidably in inclined slots 78 and 80 respectively in two movable drive plates 68 which are supported on the outer sides of the two guide plates in planes parallel to the planes of the guide plates. Each drive plate is supported on the adjacent guide plate 28 or 30 by two pins 74 and 76 which project from the outer side of the guide plate and engage in horizontal slots 70 and 72 respectively in the drive plate. The drive plates are guided by the pins 74 and 76 and slots 70 and 72 for movement in horizontal directions. Tension springs 69 connected one to each drive plate and the adjacent guide plate 28 or 30 urge the drive plates towards the magazine 144 to a rest position, shown in FIGS. 1 and 8, which is determined by the abutment of the left-hand ends (as viewed in the drawings) of the slots 70 and 72 against the pins 74 and 76. During movement of the drive plates in the direction away from this rest position the inclined slots 78 and 80 in the drive plates cooperate with the pins 50 and 52 on the side members of the loading support to move the loading support first away from the magazine 144 along the horizontal path defined by the horizontal sections of the guide slots 54 and 56 in the guide plates 28 and 30 and then down the vertical path defined by the vertical sections of the guide slots. During movement of the drive plates 68 in the reverse direction the cooperation between the inclined slots 78 and 80 and the pins 50 and 52 moves the loading support first up the vertical path and then along the horizontal path to a rest position adjacent the magazine, which position is defined by the drive plates in their rest position.

On the lower edge of each drive plate 68 is a horizontally extending toothed rack 84, and on the outer side of each guide plate 28 and 30, for cooperation with the rack on the adjacent guide plate, is a toothed pinion 86, which is rotatable about a horizontal axis. At their ends remote from the magazine 144 the racks 84 terminate at recesses 82 in the lower edges of the drive plates, and when these plates are in the rest position the recesses 82 receive the upper parts of the toothed peripheries of the pinions 86 so that the pinions are not in mesh with the racks. Fixed coaxially to each pinion 86 is a large gearwheel 92 in the periphery of the gearwheel. The large gearwheels 88 are arranged for cooperation with small gearwheels 90 supported one on the outer side of each of the guide plates 28 and 30. When the drive plates 68 are in the rest position (FIGS. 1 and 8) the gearwheels 88 also are in a rest position in which the recesses 92 in their peripheries receive parts of the toothed peripheries of the gearwheels 90 so that the gearwheels 88 are not in mesh with the gearwheels 90. This rest position of the gearwheels 88 is determined by the abutment of stops 98 on these gearwheels against the lower edges of the drive plates 68, as shown in FIGS. 1 and 8. The gearwheels 88 are urged into the rest position by tension springs 96 (FIG. 1) which exert a rotational force on these gearwheels in the clockwise direction as viewed in the drawings. By imparting a small rotational movement to the gearwheels 88 in the counter-clockwise direction, these gearwheels can be displaced from the rest position sufficiently to bring the teeth of each gearwheel in the peripheral region 94 of the gearwheel into engagement with the teeth of the associated gearwheel 90 so that the gearwheels 88 are then in mesh with the gearwheels 90 to be driven thereby.

Fixed coaxially to each of the small gearwheels 90 is a large gearwheel 100 (FIGS. 1 and 3) which meshes with an associated further small gearwheel 102. The two further small gearwheels 102 are fixed on a horizontal shaft 104 which passes through the guide plates 28 and 30 and is driven by a reversible electric motor 106 mounted on the base 2.

Between the guide plates 28 and 30, at the ends thereof which are adjacent the magazine 144, are two pairs of rubber feed rollers, each pair consisting of a drive roller 116 and above it a pressure roller 118 (see FIGS. 2, 3, 5, 6 and 7). Each pair of feed rollers is situated adjacent an end of one of the guides 46 on the side members 32 and 34 of the loading support when the support is in the rest position. The two drive rollers 116 are supported on the inner sides of the guide plates 28 and 30 for rotation about a common horizontal axis and are driven by the motor 106 via gear trains arranged on the outer sides of the guide plates 28 and 30 and speed-reducing gear 114 arranged on the inner sides of the guide plates. As shown in FIGS. 1, 2 and 3, each gear train comprises one of the small gearwheels 102, a small gear wheel 108 meshing with the gearwheel 102, a small gearwheel 110 fixed coaxially to the gearwheel 108, and a large gearwheel 112 which meshes with the gearwheel 110 and is fixed coaxially to the input gearwheel of the associated speed-reducing gear 114. The pressure rollers 118 are freely rotatable on a horizontal shaft 120 which can move up and down to a small extent in vertical slots 122 formed one in each of the guide plates 28 and 30. The shaft 120 is urged downwards against the lower ends of the slots 122 by two bowed wire springs 124 which are mounted one on each guide plate 28 and 30. When the shaft 120 is resting on the lower ends of the slots 122, each of the pressure rollers 118 is separated from the associated drive roller 116 by a gap whose height is slightly less than the thickness of a disc holder 38 and which is situated at the same level as the guides 46 on the side members 32 and 34 of the loading support when the pins 50 and 52 on these side members are in the horizontal sections of the guide slots 54 and 56 in the guide plates 28 and 30. When the pins 50 and 52 are in these sections of the guide slots, the upper surfaces of the flat parts 32A and 34A of the side members 32 and 34 lie in a horizontal plane which is tangential to the peripheries of the drive rollers 116 at the upper sides of these rollers. The function of the feed rollers 116 and 118 is to withdraw a disc holder 38 from the magazine 144 and feed it onto the loading support and subsequently to feed the disc holder back from the loading support into the magazine, as will be described later herein.

The device 14 for raising and lowering the magazine 144 comprises a platform 126 (FIGS. 1 and 2) on which the magazine is removably supported and which is movable up and down a column 128 of broad channel-shaped cross-section fixed on the base 2. The edges of the side walls of the column 128 are bent round at right angles to form two parallel vertical guide rails 130 which are engaged by sliders 132 fixed on the platform 126. Also fixed on the platform is a vertically extending toothed rack 142 with which meshes a toothed pinion 140 driven, via a speed-reducing gear 138, by the output shaft 136 of a reversible electric motor 134 mounted on the column 128. Through the rack 142 and pinion 140 the motor 134 can move the platform 126 up or down to raise or lower the magazine 144 to bring a specified disc holder 38 in the magazine to the aforesaid transfer level, which is the level at which the gaps between the upper and lower feed rollers 118 and 116 are situated. The motor 134 can be programmed to position the disc holders at this level in a prescribed sequence for continuous play.

The disc magazine 144 (FIGS. 1 and 2) has a box-like form and is open at the side 144A which faces the loading device 12. The magazine is also open at the opposite side 144B except for two narrow wall portions 148 (see also FIG. 10) which adjoin the walls at the other two sides 144C and 144D of the magazine and which limit the insertion of the disc holders 38 into the magazine. The disc holders are initially inserted into the magazine through the side 144A thereof after removal of the magazine from the platform 126. The disc holders 38 are supported in the magazine 144 by horizontal ribs 146 (FIGS. 1, 2 and 10) formed on the inner side of the two side walls 144C and 144D of the magazine, the ribs on each wall being spaced from one another by a distance sufficient to allow a disc holder to be slid into and out of the magazine between two adjacent ribs on each wall.

The disc holders 38, which may be made of a synthetic resin, each have a circular central aperture 42 (FIG. 4) in the bottom of the recess 40 in the holder and a slot 44 extending from this aperture to the periphery of the recess 40. The aperture 42 has a diameter slightly larger than that of the turntable 20 of the player 10 so that when a disc holder is being lowered by the loading support 32, 34, 36 to deposit the disc carried by the holder on the turntable, as will be described later herein, the turntable can pass through the aperture. The slot 44 is provided for the passage of the read head 26 and also to allow the read head to scan the disc during playing. On one edge of each disc holder is a protruding tail 158 with two portions 160 which project from the main body of the tail in directions substantially transverse to that in which the disc holders are transferred from the magazine 144 to the loading device 12. The orientation of the disc holders in the magazine must be such that their tails 158 protrude from the open side 144B of the magazine for cooperation with a member 152 (FIGS. 1 and 2) which forms part of the device 16 by which a small displacement is imparted to a disc holder at the beginning of the transference of that holder from the magazine 144 to the loading device 12. The member 152 is situated at the transfer level on top of a housing 150 and is slidably guided for movement in reciprocal directions parallel to the direction of transference of the disc holders, the movement being effected by means of a motor-driven cam mechanism (not shown) in the housing 150. The member 152 comprises a pair of grippers in the form of resilient fingers 154 having inwardly directed protrusions 156 at their distal ends. When a disc holder in the magazine has been brought to the transfer level and is to be transferred from the magazine to the loading device 12, the member 152 is moved forward to abut the projecting portions 160 of the tail 158 of the disc holder with the ends of its gripper fingers 154 and then, since there is no resistance to movement of the disc holder toward the loading device, to push the disc holder from the magazine into the gaps between the upper and lower feed rollers 118 and 116 so that these rollers can feed the disc holder onto the loading support 32, 34, 36. Subsequently, after the record carried by the disc holder has been played, the disc holder is fed back into the magazine by the feed rollers 116 and 118, and just before the disc holder leaves the feed rollers the projecting portions 160 of the tail 158 of the disc holder contact the ends of the gripper fingers 154 of the member 152 which has been retained in its forward position by the cam mechanism, and the projecting portions 160 of the tail 158 then cooperate with the protrusions 156 at the ends of the gripper fingers 154 to deflect the fingers outwardly, and as the fingers subsequently resile the protrusions 156 engage behind the portions 160 of the tail 158. The cam mechanism is then brought into operation by a switching means 180 (FIGS. 2, 3 and 5) to retract the member 152 and thereby pull the disc holder back into abutment with the wall portions 148 of the megazine. The gripper fingers 154 are then in the position shown in broken lines in FIG. 2. The disc holder can now move no further, so that as the member 152 continues to move back the gripper fingers are deflected outwardly again by the cooperation between the projecting portions 160 of the tail 158 of the disc holder and the protrusions 156 at the ends of the gripper fingers, and the return movement of the member 152 to its initial rest position (shown in full lines in FIG. 2) is completed.

The switching means 180 (FIGS. 2, 3 and 5) is mounted on the base 2 below the shaft 120 carrying the upper feed rollers 118 and comprises a sensor in the form of a vertically disposed plunger 182 which is urged upwardly by a coil spring 194. The plunger is mounted on a U-shaped support 188 which is slidable along horizontal guide rods 186 extending transversely of the direction in which the disc holders are transferred from the magazine 144 to the loading device 12. The guide rods 186 are supported by two spaced brackets 184 fixed on the base 2. A coil spring 190 acting in compression between one of these brackets and the support 188 urges the latter along the guide rods 186 in a direction away from a switch 192 which is mounted on the inner side of one of the brackets 184. The plunger 182 is positioned adjacent a vertical plane which is tangential to the peripheries of the lower feed rollers 116 at the sides thereof adjacent the magazine 144, and the tip of the plunger projects slightly into the path of movement of the disc holders between the magazine and the feed rollers.

In the underside of each disc holder 38 is a groove 198 (FIGS. 2, 11, 12 and 13) which forms a guideway for the plunger 182 for actuating the switching means 180. The groove opens out of the edge of the disc holder which is adjacent the loading device 12 and comprises a first portion which extends from this edge in a direction parallel to the direction of transference of the disc holders from the magazine 144 to the loading device, a second portion which extends obliquely of said direction of transference, and a third portion which extends in a direction parallel to the direction of transference and which is aligned with the plunger 182 of the switching means 180. The third portion of the groove decreases gradually in depth to form a ramp surface on the underside of the disc holder at the end of the groove. A similar ramp surface is formed in a second groove 196 which opens out of the edge of the disc holder adjacent the groove 198 and which extends wholly in a direction parallel to the direction of transference of the disc holders and is aligned with the plunger 182. A third groove 200 similar to the groove 196 opens out of the opposite edge of the disc holder, i.e., the edge on which the tail 158 is formed. At the beginning of the transference of a disc holder from the magazine 144 to the loading device 12, the ramp surface in the groove 196 depresses the plunger 182 against the action of the spring 194. Since the groove 196 extends wholly in the direction of transference of the disc holder, however, the position of the plunger on the guide rods 186 is not affected and the switching means 180 is not actuated. At the end of this transference of the disc holder the plunger rides up the ramp surface in the groove 200 and then leaves this groove to return to the fully raised position. At the beginning of the transference of the disc holder back from the loading device to the magazine, the plunger 182 is depressed by the ramp surface in the groove 200 and again remains in the same position on the guide rods 186. Just before the disc holder leaves the feed rollers 116 and 118 however, the plunger rides up the ramp surface in the groove 198, and as the disc holder leaves the feed rollers the plunger enters the oblique portion of this groove and is moved laterally thereby so that the plunger support 188 is displaced along the guide rods 186 against the action of the spring 190 and closes the switch 192 to bring the member 152 into operation to complete the movement of the disc holder into the magazine. During this final movement of the disc holder the plunger 182 is in that portion of the groove 198 which opens out of the edge of the disc holder, so that at the end of the transference of the disc holder back into the magazine the plunger leaves the groove 198 and returns to the fully raised position. At the same time the spring 190 moves the plunger support 188 back along the guide rods 186 to open the switch 192 and terminate the operation of the member 152.

The operation of the above record-disc changer to play a selected disc will now be described. A microprocessor (not shown) is arranged to control the various functions in the operation of the changer.

First, the raising and lowering device 14 is operated to bring the disc holder 38 carrying the selected record to the transfer level, opposite the gaps between the upper and lower feed rollers 118 and 116. The device 16 is then operated to displace the disc holder into the gaps, thereby lifting the pressure rollers 118 slightly against the force of the springs 124 so that these springs will press the pressure rollers 118 against the upper surface of the disc holder. FIG. 5 shows the leading part of the disc holder, represented by the dot-dash lines 38', inserted between the pressure rollers 118 and the drive rollers 116. FIG. 5 also shows the plungers 182 of the switching means 180 depressed by the lower surface of the disc holder, but as already explained this has no effect on the switch 192 of the switching means. The initial displacement of the disc holder is sensed by a device (not shown) which switches on the motor 106 to rotate the drive rollers 116 through the shaft 104, the gearwheels 102, 108, 110 and 112 and the speed-reducing gears 114. Through the gearwheels 102 the motor 106 also rotates the gearwheels 100, and with them the gearwheels 90, of the gear trains through which the pinions 86 which cooperate with the racks 84 on the drive plate 68 are driven, but at this stage the gearwheels 88 of these gear trains are in their rest position (FIGS. 1 and 8), so no rotation is transmitted to the pinions 86, and the drive plates 68, and with them the loading support 32, 34, 36, consequently remain in their rest position.

The disc holder 38 is now fed in the direction of the arrow A (FIGS. 5, 6 and 8) onto the side members 32 and 34 of the loading support by the feed rollers, the disc holder being guided by the guides 46 on the side members 32 and 34. Shortly before the disc holder leaves the feed rollers its leading edge abuts the stops 48 on the side members 32 and 34 so that during the final stage of its movement by the feed rollers the disc holder imparts a small movement to the loading support in the direction of the arrow A. The pins 50 and 52 on the side members of the loading support thus begin to move along the horizontal sections of the guide slots 54 and 56 in the guide plates 28 and 30. By cooperation with the inclined slots 78 and 80 in the drive plates 68 the pins 50 and 52 move the drive plates away from the rest position sufficiently to bring the racks 84 into mesh with the pinions 86 and rotate these pinions to turn the gearwheels 88 away from their rest position into engagement with the gearwheels 90 which are being driven by the motor 106. The transmission between the motor and each drive plate being thus engaged, the motor now takes over the drive of the drive plates to move them in the direction of the arrow A. Through the cooperation between the inclined slots 78 and 80 and the pins 50 and 52 the drive plates move the loading support in the same direction until the pins 50 and 52 reach the ends of the horizontal sections of the guide slots 54 and 56. During this horizontal movement of the loading support by the drive plates, the disc holder 38 on the loading support leaves the feed rollers 116 and 118 so that it is free to be subsequently moved in the vertical direction. When the pins 50 and 52 are at the ends of the horizontal sections of the guide slots 54 and 56, as shown in FIG. 6, the disc 22 in the disc holder 38 is located with its centre hole 22A directly above the centering pin 24 of the turntable 20 of the player 10. Also, the pins 50 are engaged in the recesses 64 in the cheek plates 60 of the arm 58 carrying the pressure ring 66. During the remainder of the movement of the drive plates 68 in the direction of the arrow A, the cooperation between the inclined slots in the drive plates and the pins 50 and 52 results in the pins moving down the vertical sections of the guide slots 54 and 56 to lower the loading support 32, 34, 36 and with it the disc holder 38. During this downward movement of the disc holder the turntable 20 passes through the central aperture 42 in the holder and the disc 22 is left supported on the centering pin 24 of the turntable, as shown in FIG. 7. At the same time, as the pins 50 move down the vertical sections of the guide slots 54 they swing the arm 58 down to the operative position in which the pressure ring 66 presses the disc 22 onto the centering surface 24A of the centering pin 24 so that the disc is accurately located and centred on the turntable. The pressure ring engages the disc immediately after the disc has engaged the centering surface 24A. When the loading support 32, 34, 36 has been lowered to a predetermined position in which the disc holder 38 is clear of the disc 22, switching means (not shown) are automatically actuated to stop the motor 106 and to start the motors (not shown) which drive the turntable and track the read head 26.

When the disc 22 has been played the motor 106, under the command of a signal emitted by the read head 26 and fed into the micro-processes, operates in the reverse direction to move the drive plates 68 back to the rest position. During this movement the drive plates, through the cooperation between the inclined slots 78 and 80 and the pins 50 and 52 and the guidance of the pins 50 and 52 in the slots 54 and 56, raise the loading support 32, 34, 36 so that the disc holder 38 lifts the disc 22 off the centering pin 24. Simultaneously, as the pins 50 move up the vertical sections of the guide slots 54, the arm 58 is returned to its inoperative position. The loading support is then moved horizontally by the drive plates 68 back to its rest position, and during this movement the disc holder 38 enters the gaps between the upper and lower feed rollers 118 and 116. The return of the drive plates to the rest position also brings the racks 84 out of mesh with the pinions 86 and disengages the gearwheels 88 from the gearwheels 90. When the loading support reaches the rest position the feed rollers slide the disc holder 38 off the loading support and onto the appropriate pair of ribs 146 in the magazine 144. As the disc holder leaves the feed rollers the grippers 154 of the member 152 of the device 16 engage behind the laterally projecting portions 160 of the tail 158 of the disc holder, and at the same time the groove 198 in the underside of the disc holder displaces the plunger 182 of the switching means 180 to close the switch 192 and thereby operate the member 152 to pull the disc holder into its fully inserted position in the magazine 144. This final movement of the disc holder results in the motor 106 being automatically switched off by the device which initially started the motor. Alternatively, the switching means 180 can also be arranged to switch off the motor 106.

The above operations are subsequently repeated to load and play the next and each succeeding selected disc in the prescribed order.

In the above embodiment of the invention the loading device comprises two assemblies each comprising a guide plate with L-shaped guide slots, a drive plate with inclined slots and with horizontal guide slots, pins for cooperating with these slots, a toothed rack on the drive plate and a pinion for cooperation with the rack, and gearwheels for transmitting drive to the pinion. It is within the scope of the invention to have an arrangement in which the loading device comprises only one such assembly.

What is claimed is:

1. A record-disc player with a loading device for loading a record disc on the turntable of the player, the loading device comprising:
   a movable loading support for supporting the disc,
   a guide plate fixed in a vertical plane and formed with L-shaped guide slots each comprising a horizontal section and a vertical section extending downwardly from the horizontal section at an end thereof, a drive plate supported for movement in a horizontal direction in a plane parallel to the plane of the guide plate and formed with slots which are inclined to the direction of movement of the drive plate, the loading support comprising pins, each of which engages in an associated one of said guide slots and an associated one of said inclined slots, and a toothed rack on the drive plate and a pinion for cooperation with the rack to move the drive plate, said guide slots being arranged to guide the loading support, by cooperation with said pins, from a rest position along a horizontal path and down a vertical path to deposit the record disc supported on the loading support on the turntable, and said inclined slots being cooperable with said pins, during movement of the drive plate, to move the loading support along and down said paths respectively, characterized in that the player comprises a pivotal arm carrying a pressure member for urging the loaded disc into the centred position on the turntable, the arm being pivotable between an inoperative position and an operative position about a horizontal axis perpendicular to the directions of movement of the loading support, and the arm comprising a part formed with a recess which, when the arm is in the inoperative position, is located beside and coincides with the horizontal section of one of the guide slots in the guideplate at the end of said section which adjoins the vertical section of the slot, with the mouth of the recess facing towards the other end of the horizontal section, so that when the pin on the loading support which engages in that guide slot reaches the end of the horizontal section of the slot which adjoins the vertical section during the loading movement of the loading support, the pin enters said recess, and as the pin moves down the vertical section of the slot it cooperates with the recess to move the arm to the operative position.

2. A record-disc player as claimed in claim 1, characterized in that said part of the arm comprises a plate which is pivotally supported on the guide plate for movement about said axis in a plane parallel to the plane of the guide plate, and in an edge which the recess is formed.

3. A record-disc player as claimed in claim 1 characterized in that the arm is urged by spring means to its inoperative position, which position is determined by stop means on the guide plate.

4. A record-disc player as claimed in claim 2, characterized in that the arm is urged by spring means to its inoperative position, which position is determined by stop means on the guide plate.

* * * * *